US010382583B2

(12) United States Patent
Kessler

(10) Patent No.: US 10,382,583 B2
(45) Date of Patent: Aug. 13, 2019

(54) METHOD AND SYSTEM TO UPDATE A FRONT END CLIENT

(71) Applicant: Microsoft Technology Licensing, LLC, Redmond, WA (US)

(72) Inventor: Jacob Kessler, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 13/869,803

(22) Filed: Apr. 24, 2013

(65) Prior Publication Data

US 2014/0324942 A1 Oct. 30, 2014

(51) Int. Cl.
*H04L 29/08* (2006.01)
*G06F 8/65* (2018.01)

(52) U.S. Cl.
CPC ............... *H04L 67/34* (2013.01); *G06F 8/65* (2013.01)

(58) Field of Classification Search
CPC ....... H04L 69/329; H04L 29/06; H04L 67/02; H04L 67/42
USPC .......................................... 709/201–203, 248
See application file for complete search history.

(56) References Cited

U.S. PATENT DOCUMENTS

| | | | | |
|---|---|---|---|---|
| 8,266,245 B1 * | 9/2012 | Saviano | .............. | G06F 21/6218 709/217 |
| 8,417,556 B2 * | 4/2013 | Moukas | .............. | G06Q 10/0631 705/7.29 |
| 8,554,826 B2 * | 10/2013 | O'Dea | ................... | G16H 10/60 709/201 |
| 2002/0032725 A1 * | 3/2002 | Araujo | .................... | H04L 29/06 709/203 |
| 2002/0065939 A1 * | 5/2002 | Liu | ...................... | G06F 1/1626 709/248 |
| 2002/0143764 A1 * | 10/2002 | Martin | .................. | G06F 16/252 |
| 2003/0046365 A1 * | 3/2003 | Pfister | ................. | G06F 16/9574 709/219 |
| 2004/0030739 A1 * | 2/2004 | Yousefi'zadeh | .... | G06F 16/2471 709/201 |
| 2005/0071758 A1 * | 3/2005 | Ehrich | .................... | G06F 9/451 715/234 |
| 2007/0050780 A1 * | 3/2007 | O'Dea | .................. | G16H 10/60 719/313 |

(Continued)

FOREIGN PATENT DOCUMENTS

CN 101174219 A 5/2008
CN 104769572 A 7/2015
(Continued)

OTHER PUBLICATIONS

"International Application Serial No. PCT/US2014/032230, International Search Report dated Sep. 5, 2014", 2 pgs.

(Continued)

*Primary Examiner* — Edward Kim
(74) *Attorney, Agent, or Firm* — Schwegman Lundberg & Woessner, P.A.

(57) ABSTRACT

A method and system to update a front-end client are described. A front-end client may be provided with a reloading wrapper. A reloading wrapper may be configured to detect that a new version of the associated client is available, fetch the new version of the client, test it, and replace the currently executing version of the client with the new version without disrupting the operation of the front-end.

20 Claims, 5 Drawing Sheets

(56) References Cited

U.S. PATENT DOCUMENTS

| | | | | |
|---|---|---|---|---|
| 2010/0161717 | A1* | 6/2010 | Albrecht | G06F 16/9574 709/203 |
| 2010/0161821 | A1* | 6/2010 | Slamkovic | G06F 9/54 709/230 |
| 2011/0055156 | A1* | 3/2011 | Roberts | G06F 11/2094 707/626 |
| 2011/0252082 | A1* | 10/2011 | Cobb | H04L 65/605 709/203 |
| 2011/0295936 | A1* | 12/2011 | Gill | G06F 16/954 709/203 |
| 2012/0254917 | A1* | 10/2012 | Burkitt | H04N 21/431 725/40 |
| 2013/0081039 | A1* | 3/2013 | Glew | G06F 9/5011 718/103 |
| 2013/0111489 | A1* | 5/2013 | Glew | G06F 9/4881 718/103 |
| 2014/0280691 | A1* | 9/2014 | Buerner | H04L 67/02 709/217 |

FOREIGN PATENT DOCUMENTS

| | | |
|---|---|---|
| IN | 2655DELNP2015 A | 9/2015 |
| WO | WO-2014175998 A1 | 10/2014 |

OTHER PUBLICATIONS

"International Application Serial No. PCT/US2014/032230, Written Opinion dated Sep. 5, 2014", 4 pgs.

"Indian Application Serial No. 2655/DELNP/2015, Amendment filed Jul. 17, 2015", 10 pgs.

"International Application Serial No. PCT/US2014/032230, International Preliminary Report on Patentability dated Nov. 5, 2015", 6 pgs.

"Chinese Application Serial No. 201480002889.5, Office Action dated Aug. 3, 2016", W/ English Translation, 15 pgs.

"Chinese Application Serial No. 201480002889.5, Response filed Feb. 20, 2017 to Office Action dated Aug. 3, 2016", With English Translation of Claims, 13 pgs.

"Chinese Application Serial No. 201480002889.5, Response filed Aug. 29, 2017 to Office Action dated Jun. 14, 2017", W/ English Claims, 13 pgs.

"European Application Serial No. 14788794.7, Extended European Search Report dated Nov. 2, 2016", 8 pgs.

"European Application Serial No. 14788794.7, Response filed May 26, 2017", 34 pgs.

Habib, Seifzadeh, et al., "A survey of dynamic software updating", Journal of Software: Evolution and Process, vol. 25. No. 5, (Apr. 25, 2012), 535-568.

"Chinese Application Serial No. 201480002889.5, Office Action dated Jan. 19, 2018", with English translation of claims, 8 pgs.

"Chinese Application Serial No. 201480002889.5, Response filed Apr. 21, 2018 to Office Action dated Jan. 19, 2018", with English translation of claims, 9 pgs.

* cited by examiner

METHOD AND SYSTEM TO UPDATE A FRONT END CLIENT

TECHNICAL FIELD

This application relates to the technical fields of software and/or hardware technology and, in one example embodiment, to systems and methods to update a front-end client.

BACKGROUND

A web-based platform, such as, e.g., a social networking website may be accessed by users via a web browser. When a user sends a request to the web-based platform, e.g., by activating a visual control on the home page presented by the web browser, the request is received by the web-based platform. In response to the request, another web page may be generated and provided to the web browser.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
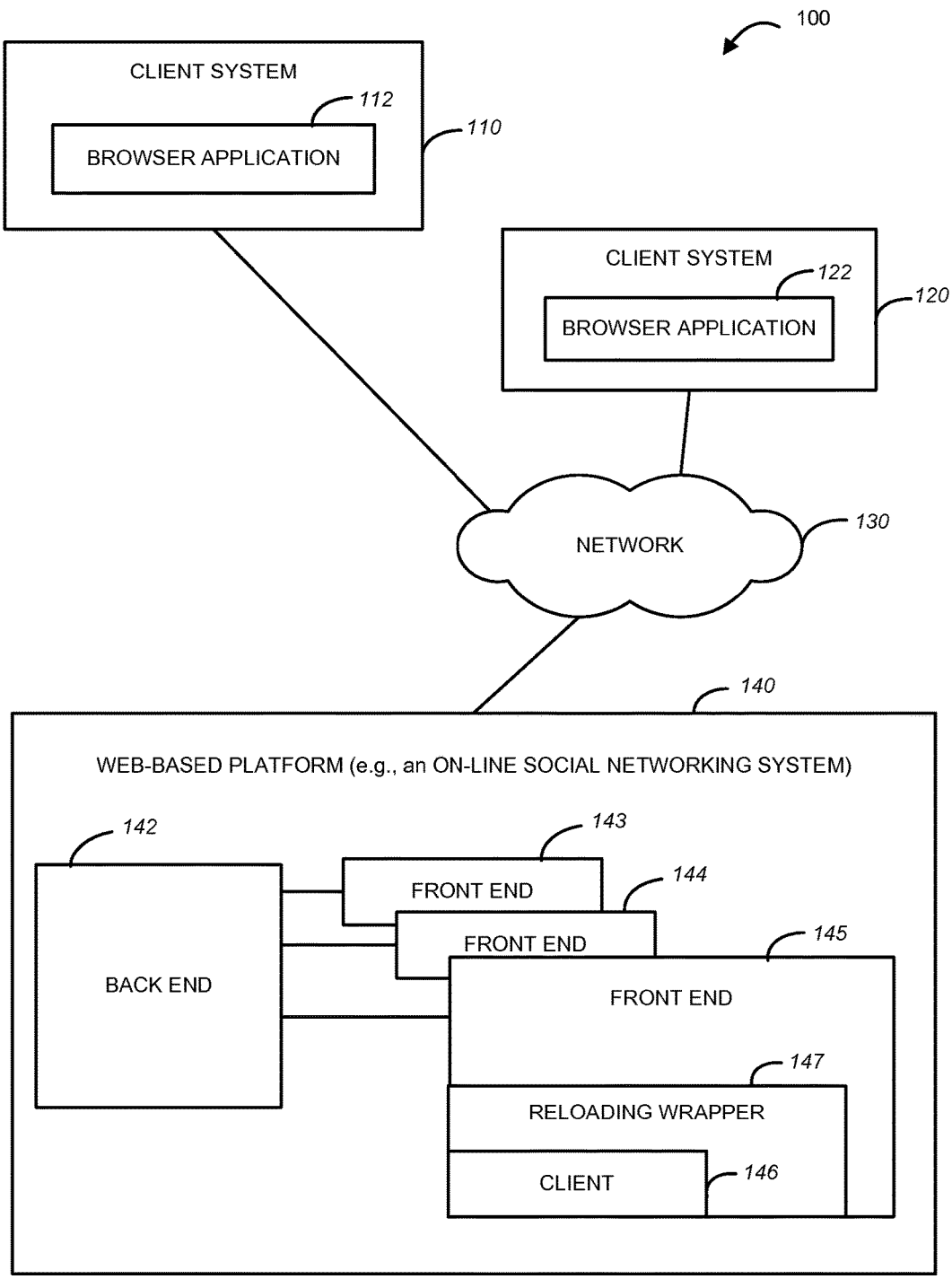
FIG. 1 is a diagrammatic representation of a network environment within which an example method and system to update a front-end client may be implemented.

A method and system to update a front-end client is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

A web-based platform, such as, e.g., an on-line social network website, may be designed to include so-called front-end services (or a front-end) and to designate data storage services to so-called back-end services (or a back-end). Back-end services include storage repositories for data. In the context of an on-line social network website, the data stored by the back-end services may include user's entitlements. User's entitlements may be data indicating what actions a particular user is permitted to perform on the website, how many search results can the user retrieve in response to a search, which features can be presented to the user, etc. Front-end services may be designated to process users' requests and to generate requested web pages. A front-end service, also referred to as merely "a front-end" for the purposes of this description, may be a web application executing on a computer system. A front-end service may be responsible for obtaining information needed for generating a requested web page and for providing the web page to the requesting computing system. Depending on the complexity of the requested web page, the front-end may need to make multiple calls to the back-end servers, which can be a great number of calls. In one embodiment, a front-end may be equipped with a module that is configured to mediate calls made by the front-end to the back-end. Such module may be provided with each front-end and may be referred to as a front-end client module or merely a client.

A front-end may have little or no ability to predict which data may need to be retrieved for any particular user. In one example embodiment, a client module that is provided with the front-end may be configured to build a list and a dependency graph of the types of data being requested from the back-end with respect to users' sessions, and use that list to preemptively fetch data from the back-end for a user as soon as a user logs on to the website, based on the constructed list of the types of data. Examples of various types of data associated with a particular user may be associated with various entitlements of a user, based on that user's status with respect to the website. The status of a user with respect to the website may depend on which, of many, subscriptions the user has subscribed to. The data of the user pre-fetched in this manner is no longer available to the front-end after a session for that user has ended.

In the context of a website that provides different versions of the service based on the status of a particular user, and where some data stored by the back-end is related to various entitlements of a user with respect to the website, a client module provided with a front-end that services requests directed to the website may be referred to as an entitlement client. In some embodiments, an entitlement client may be provided together with a so-called reloading wrapper module. A reloading wrapper module may be configured to detect that a new version of the associated client is available, fetch the new version of the client, test it, and replace the currently executing version of the client with the new version without disrupting the operation of the front-end. Utilizing a reloading wrapper in this manner may be especially beneficial where a web-based platform comprises more than just a few front-ends, each front-end cooperating with its copy of the entitlement client. A method and system to update a front-end client may be implemented in the context of a network environment 100, as illustrated in FIG. 1.

As shown in FIG. 1, the network environment 100 may include client systems 110 and 120 and a web-based platform 140. The client systems 110 and 120 may run respective browser applications 112 and 122 and may have access to the web-based platform 140 via a communications network 130. The communications network 130 may be a public network (e.g., the Internet, a mobile communication network, or any other network capable of communicating digital data).

The client system 110 may utilize the browser application 112 to access services provided by the web-based platform 140. The web-based platform 140, in one example embodiment, is an on-line social networking system. As shown in FIG. 1, the web-based platform 140 includes front-ends (reference numerals 143, 144, and 145), and a back-end 142. A front-end provided by the web-based platform 140 is a web application hosted at a front-end server system of the web-based platform 140. The back-end 142 is a back-end application hosted at a back-end server system of the web-based platform 140. The back-end 142 is configured to provide storage repository to store information used in constructing one or more web pages of the front-end web applications 143, 144, and 145.

As mentioned above, a front-end may have an associated client module, where the client module is configured to mediate calls from the front-end web application to the back-end application. A client module that mediates calls from the front-end web application to the back-end application may be provided with a so-called reloading wrapper. A reloading wrapper may be configured to automatically detect a new version of the client module, obtain the new version of the client module from a predetermined storage location, and replace the client module with the new version of the client module without disrupting operation of the front-end web application. The front-end 145 is shown as associated with a client 146 and a reloading wrapper 174. It will be noted that, while not shown in FIG. 1, every front-end of the web-based platform 140, in one embodiment, includes an associated client and an associated reloading wrapper. Some modules of an example reloading wrapper are illustrated in FIG. 2.

Figure 2:
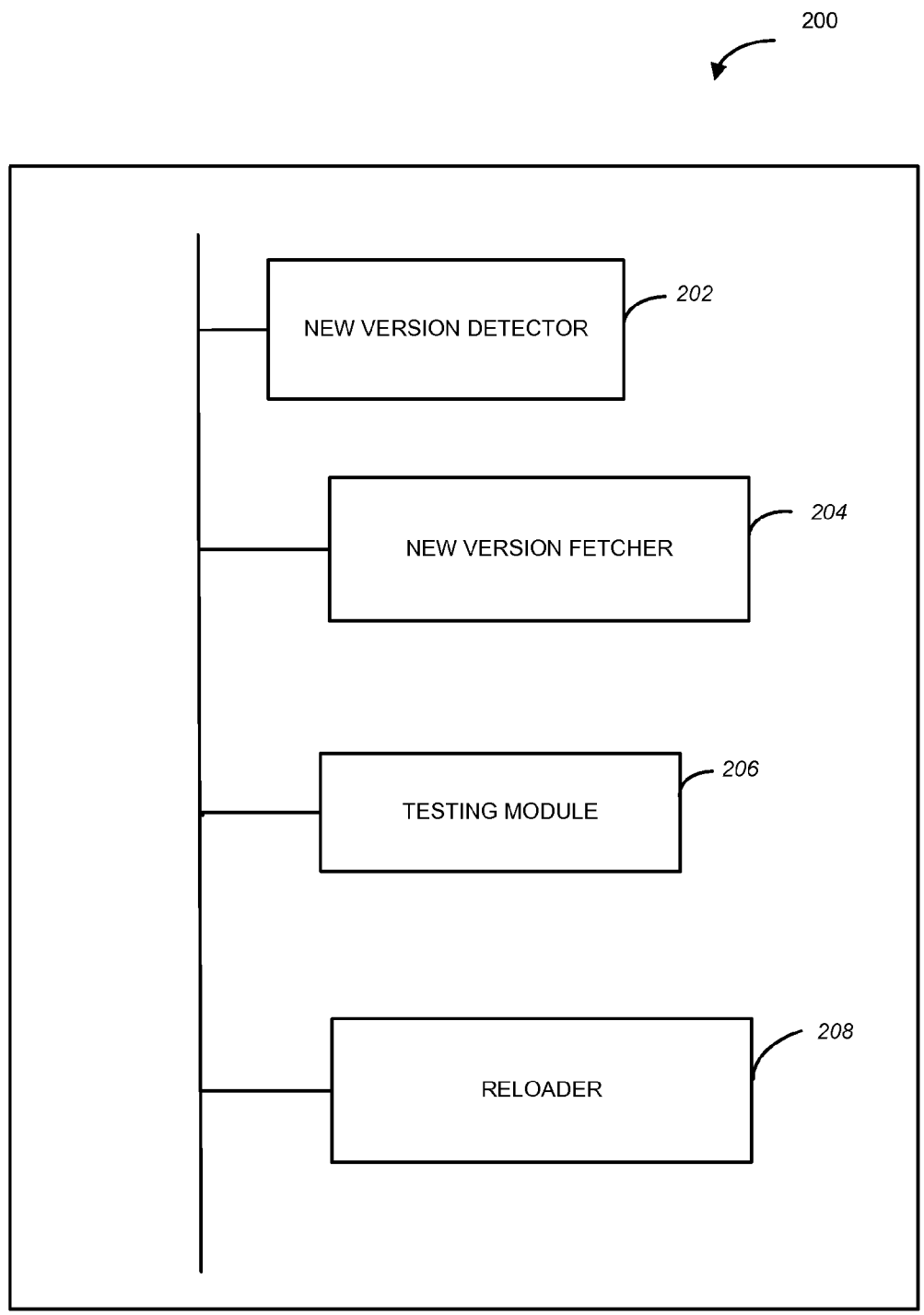
FIG. 2 is block diagram of a reloading wrapper, in accordance with one example embodiment.

FIG. 2 is a block diagram of a system 200 comprising some modules of an example reloading wrapper, in accordance with one example embodiment. As shown in FIG. 2, the system 200 includes a new version detector 202, a new version fetcher 204, a testing module 206, and a reloader 208. The new version detector 202 may be configured to automatically detect a new version of the client module. As explained above, a new version of the client module may be accessible at a location provided by the back-end 142 of FIG. 1. The new version fetcher 204 may be configured to obtain the new version of the client module from the back-end 142. The testing module 206 may be configured to load and instantiate the new version of the client module at the associated front-end server and to test the new version of the client module for correctness. The reloader 208 may be configured to replace the client module currently executing at the associated front-end server with the new version of the client module without disrupting operation of the front-end web application. Some modules of an example client application are illustrated in FIG. 3.

Figure 3:
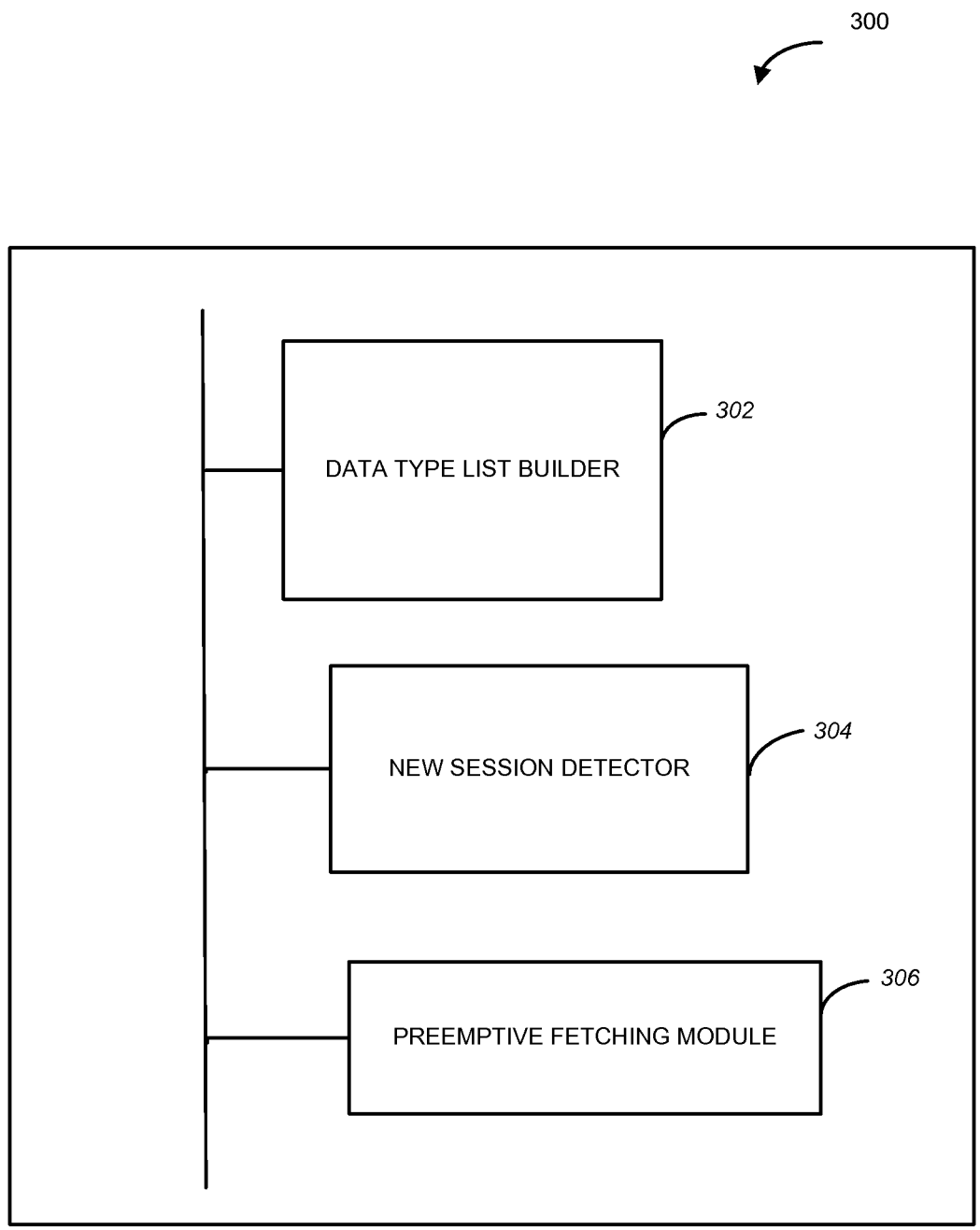
FIG. 3 is block diagram of a client module, in accordance with one example embodiment.

As shown in FIG. 3, the system 300 includes a data type builder 302, a new session detector 304, and, optionally, a preemptive fetching module 306. The data type builder 302 may be configured to maintain a list of one or more types of data used by the associated front-end web application for constructing one or more web pages of the front-end web application. The new session detector 304 may be configured to detect that a new session has been commenced for a user. The preemptive fetching module 306, when included in the system 300, may be configured to prefetch, from the back-end, data associated with the identification of the user, based on the list of one or more types of data used by the front-end module, in response to detecting a new session associated with an identification of a user. An example method to update a front-end client can be described with reference to FIG. 4.

Figure 4:
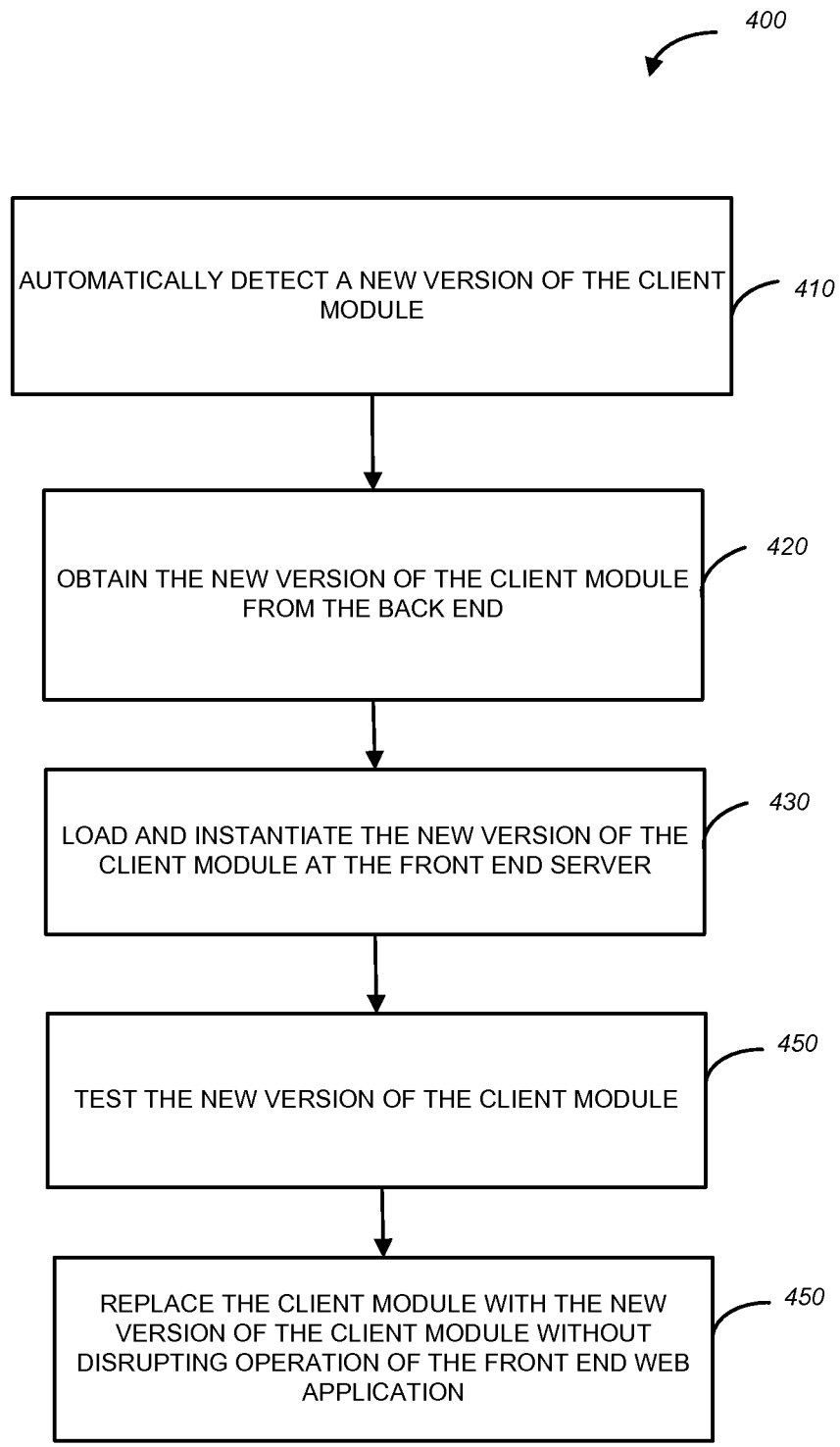
FIG. 4 is a flow chart of a method to update a front-end client, in accordance with an example embodiment.

FIG. 4 is a flow chart of a method 400 to update a front-end client, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at one or more servers of the web-based platform 140 of FIG. 1 and, specifically, at the system 200 shown in FIG. 2.

As shown in FIG. 4, the method 400 commences at operation 410, when the new version detector 202 of FIG. 2 automatically detects a new version of the client module, which, as explained above, may be accessible at a location provided by the back-end 142 of FIG. 1. At operation 420, the new version fetcher 204 obtains the new version of the client module from the back-end 142. The testing module 206 loads and instantiates the new version of the client module at the associated front-end server at operation 430. At operation 440, the testing module 206 tests the new version of the client module for correctness. If the testing module 206 determines that the new version of the client module is executing correctly, the reloader 208 replaces the client module that is currently executing at the associated front-end server with the new version of the client module without disrupting operation of the front-end web application.

Example code for updating a client automatically and without disrupting the operation of the associated front-end web application is shown in Table 1 below.

TABLE 1

```
private void checkAndReload( )
{
    int myVersion = _target.get( ) != null ? _target.get( ).getVersion( ) : 0;
    LOG.info("Reloading client checking for updates to version " + myVersion);
    try
    {
        int serverVersion = _bps.getClientImplVersion( );
        if (serverVersion > myVersion)
        {
            LOG.info("Client attempting reload, stand by");
            ClassReloader ldr = new ClassReloader(_bps, this.getClass( ).getClassLoader( ));
            Class newClientClass = ldr.getNewClientImpl( );
            if (newClientClass != null)
            {
                Class[ ] parTypes = new Class[ ] {EntitlementsBPS.class,
                        long.class, double.class, long.class, long.class, long.class,
                        int.class, RpcTraceHandler.class, ICFinder.class};
                Method boot = newClientClass.getMethod("bootstrap", parTypes );
                EntitlementsClient newClient = (EntitlementsClient)boot.invoke(null, _bps,
```

TABLE 1-continued

```
            _cooldown,
            _failures,
            _failureWindow,
            _timeBetweenUpdates,
            _timeBetweenPings,
            _type.encode( ),
            _rpcTraceHandler,
            _icFinder);
        if (_target.get( ) == null || newClient.getVersion( ) > _target.get( ).getVersion( ))
            _target.set(newClient);
        LOG.info("Client reload completed, now running version " + _target.get( ).getVersion( ));
      }
    }
  } catch (InternalException e)
  {
    // Don't try to reload, just wait for next time
    LOG.error("Entitlements Reloader unable to check or update the client version: ", e);
  } catch (ClassNotFoundException e)
  {
    LOG.error("Entitlements Reloader unable to locate new class: ", e);
  } catch (NoSuchMethodException e)
  {
    LOG.error("Bootstrap Factory Method not found, unable to instantiate new client: ", e);
  }
  catch (InvocationTargetException e)
  {
    LOG.error("Entitlements Reloader unable to instantiate new client: ", e);
  } catch (IllegalAccessException e)
  {
    LOG.error("Entitlements Reloader not allowed to instantiate new client: ", e);
  }
  catch (IllegalArgumentException e)
  {
    LOG.error("Entitlements Reloader gave incorrect arguments: ", e);
  }
 }
}
```

Figure 5:
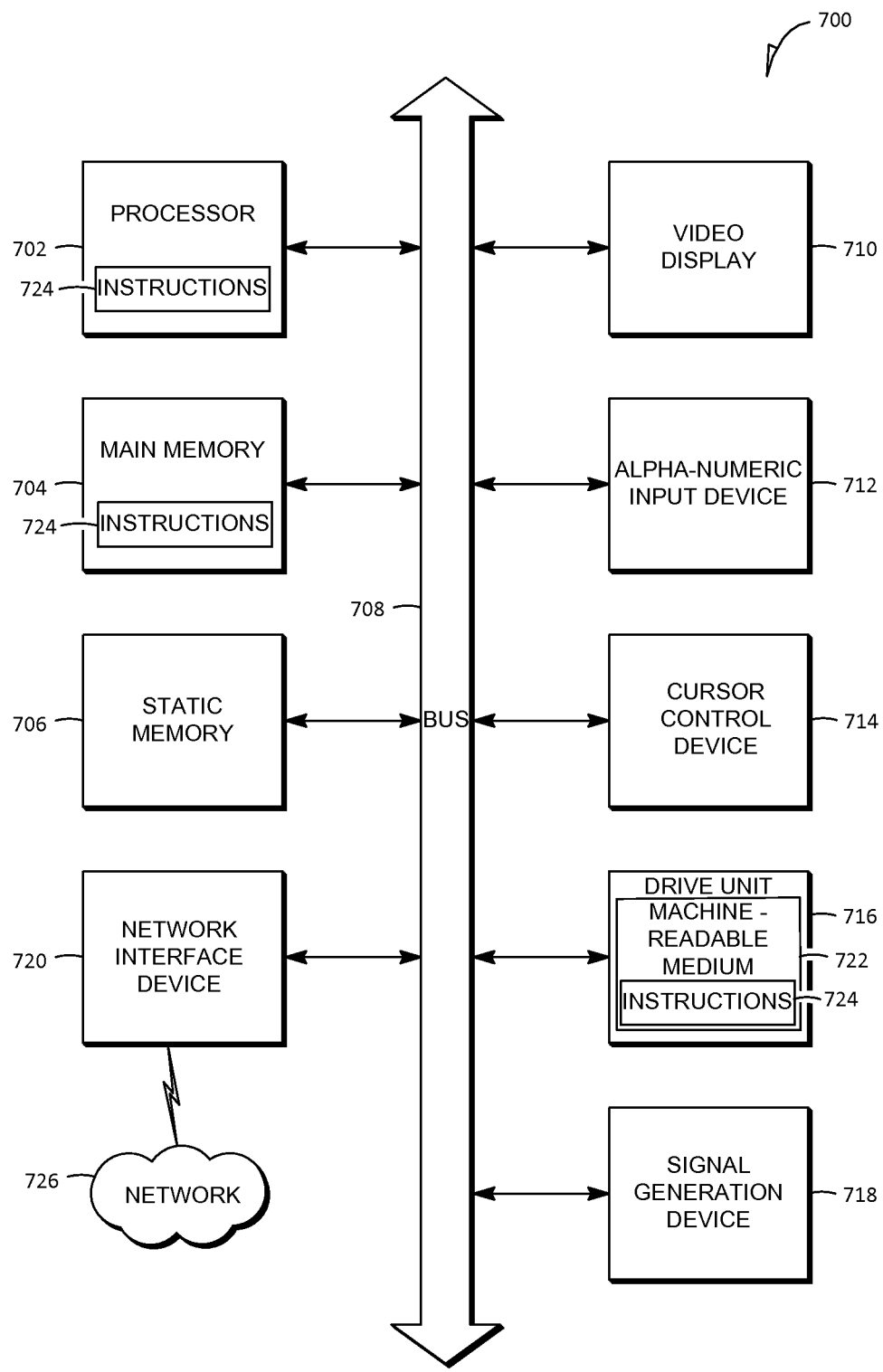
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to automatically update a front-end client has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. For example, while embodiments have been described with reference to the context of a website that provides different versions of the service based on the status of a particular user and an entitlement client, the techniques described herein may be utilized beneficially in any environment where a client mediates requests by a front-end for data maintained and/or stored by a back-end.

The invention claimed is:

1. A method comprising:
hosting, using at least one processor, a plurality of front-end web applications, each front end web application being at a front-end server system to provide a first user that has a first set of entitlements for web-based services with access to a first version of web-based services and to provide a second user that has a second set of entitlements for the web-based services with access to a second version of the web-based services;

hosting, using at least one processor, a back-end application at the back-end server, the back-end application to provide a storage repository to store information used in constructing one or more web pages of the front-end web applications, the stored information including the users' entitlements for the web-based services;

hosting, using at least one processor, a plurality of entitlement client modules, each entitlement client module being associated with a respective front-end web application and configured to mediate calls from the associated front-end web application to the back-end application, wherein an entitlement client module builds a list and a dependency graph of types of data being requested from the back-end application with respect to a user's sessions with the web-based services and uses the list to preemptively fetch data from the back-end application for the user based on the constructed list of the types of data in order to generate web pages requested by the user;

utilizing, using at least one processor, a plurality of reloading wrapper modules, each reloading wrapper module associated with a respective entitlement client module for:
  automatically detecting a new version of the entitlement client module,
  obtaining the new version of the entitlement client module, and
  replacing the entitlement client module with the new version of the entitlement client module without disrupting operation of the front-end web application.

2. The method of claim 1, wherein the detecting of a new version of the entitlement client module comprises comparing respective version numbers of the hosted entitlement client module and a version of the client module stored at a predetermined storage location.

3. The method of claim 1, wherein the detecting of a new version of the entitlement client module comprises periodically checking for existence of a new version of the entitlement client module at a predetermined storage location.

4. The method of claim 3, wherein the predetermined storage location is a location provided by the back-end application.

5. The method of claim 1, wherein the utilizing of a reloading wrapper module comprises, prior to the replacing of the client module with the new version of the client module:
  loading and instantiating the new version of the client module at the front-end server; and
  testing the new version of the client module.

6. The method of claim 1, wherein the utilizing of a reloading wrapper module comprises compiling the new version of the client module.

7. The method of claim 1, wherein the new version of the entitlement client module is a compiled version of the new version of the entitlement client module.

8. The method of claim 1, comprising utilizing the entitlement client module for:
  maintaining a list of one or more types to data used by the associated front-end web application for constructing one or more web pages of the associated front-end web application, and in response to detecting a new session associated with an identification of a user, prefetching from the back-end data associated with the identification of the user, based on the list of one or more types of data used by the associated front-end web application.

9. The method of claim 1, wherein the plurality of front-end applications provide services of an on-line social network.

10. The method of claim 9, wherein the back-end application is to store data of members of the on-line social network.

11. A computer-implemented system comprising:
  at least one processor coupled to a memory;
  a plurality of front-end web applications, each front end web application being at a front-end server system to provide a first user that has a first set of entitlements for web-based services with access to a first version of web-based services and to provide a second user that has a second set of entitlements for the web-based services with access to a second version of the web-based services;
  a back-end application to provide a storage repository to store information used in constructing one or more web pages of the front-end web applications, the stored information including the users' entitlements for the web-based services; and
  a plurality of entitlement client modules, each entitlement client module being associated with a respective front-end web application and configured to mediate calls from the associated front-end web application to the back-end application, wherein an entitlement client module builds a list and a dependency graph of types of data being requested from the back-end application with respect to a user's sessions with the web-based services and uses the list to preemptively fetch data from the back-end application for the user based on the constructed list of the types of data in order to generate web pages requested by the user;
  a plurality of reloading wrapper modules, each reloading wrapper module associated with a respective entitlement client module to, using the at least one processor:
    automatically detect a new version of the entitlement client module,
    obtain the new version of the entitlement client module from the back-end, and
    replace the entitlement client module with the new version of the entitlement client module without disrupting operation of the front-end web application.

12. The system of claim 11, wherein the a reloading wrapper module is to compare respective version numbers of the hosted entitlement client module and a version of the entitlement client module stored at a predetermined storage location.

13. The system of claim 11, wherein a reloading wrapper module is to periodically check for existence of a new version of the entitlement client module at a predetermined storage location.

14. The system of claim 13, wherein the predetermined storage location is a location provided by the back-end application.

15. The system of claim 11, wherein a reloading wrapper module is to, prior to the replacing of the entitlement client module with the new version of the entitlement client module:
  load and instantiate the new version of the entitlement client module at the front-end server; and
  test the new version of the entitlement client module.

16. The system of claim 11, wherein a reloading wrapper module is to compile the new version of the entitlement client module.

17. The system of claim 11, wherein the new version of the entitlement client module is a compiled version of the new version of the entitlement client module.

18. The system of claim 11, wherein the entitlement client module is to:
   maintain a list of one or more types to data used by the associated front-end web application for constructing one or more web pages of the associated front-end web application, and
   in response to detecting a new session associated with an identification of a user, prefetch from the back-end data associated with the identification of the user, based on the list of one or more types of data used by the associated front-end web application.

19. The system of claim 11, wherein the plurality of front-end applications provide services of an on-line social network.

20. A machine-readable non-transitory storage medium having instruction data to cause a machine to perform operations comprising:
   executing a plurality of front-end web applications, each front end web application being at a front-end server system to provide a first user that has a first set of entitlements for web-based services with access to a first version of web-based services and to provide a second user that has a second set of entitlements for the web-based services with access to a second version of the web-based services;
   executing a back-end application, the back-end application to provide a storage repository to store information used in constructing one or more web pages of the front-end web applications, the stored information including the users' entitlements for the web-based services; and
   executing a plurality of entitlement client modules, each entitlement client module being associated with a respective front-end web application and configured to mediate calls from the associated front-end web application to the back-end application, wherein an entitlement client module builds a list and a dependency graph of types of data being requested from the back-end application with respect to a user's sessions with the web-based services and uses the list to preemptively fetch data from the back-end application for the user based on the constructed list of the types of data in order to generate web pages requested by the user;
   executing a plurality of reloading wrapper module, the reloading wrapper modules, each reloading wrapper module associated with a respective entitlement client module to:
      automatically detect a new version of the entitlement client module,
      obtain the new version of the entitlement client module, and
      replace the entitlement client module with the new version of the entitlement client module without disrupting operation of the front-end web application.

* * * * *